(12) United States Patent
Serkh et al.

(10) Patent No.: US 10,520,039 B2
(45) Date of Patent: Dec. 31, 2019

(54) ISOLATING DECOUPLER

(71) Applicant: GATES CORPORATION, Denver, CO (US)

(72) Inventors: Alexander Serkh, Troy, MI (US); Essie Rahdar, Costa Mesa, CA (US)

(73) Assignee: Gates Corporation, Denver, CO (US)

( * ) Notice: Subject to any disclaimer, the term of this patent is extended or adjusted under 35 U.S.C. 154(b) by 194 days.

(21) Appl. No.: 15/688,430

(22) Filed: Aug. 28, 2017

(65) Prior Publication Data

US 2019/0063507 A1 Feb. 28, 2019

(51) Int. Cl.
*F16D 7/02* (2006.01)
*F16D 41/20* (2006.01)
*F16H 55/36* (2006.01)

(52) U.S. Cl.
CPC ........... *F16D 7/022* (2013.01); *F16D 41/206* (2013.01); *F16H 55/36* (2013.01); *F16D 2250/0076* (2013.01)

(58) Field of Classification Search
None
See application file for complete search history.

(56) References Cited

U.S. PATENT DOCUMENTS

| | | | |
|---|---|---|---|
| 1,983,824 A * | 12/1934 | Starkey | F16D 41/206 192/41 S |
| 2,742,126 A * | 4/1956 | Morton | F16D 41/206 192/41 S |
| 6,083,130 A | 7/2000 | Mevissen et al. | |
| 7,618,337 B2 | 11/2009 | Jansen et al. | |
| 8,888,619 B2 | 11/2014 | Antchak et al. | |
| 8,931,610 B2 | 1/2015 | Serkh | |
| 9,033,832 B1 | 5/2015 | Serkh et al. | |
| 9,181,989 B2 | 11/2015 | Mevissen et al. | |
| 9,441,681 B2 | 9/2016 | Williams | |
| 9,651,099 B2 | 5/2017 | Antchak et al. | |
| 2004/0104090 A1 * | 6/2004 | Jansen | F16D 41/20 192/41 S |
| 2007/0254756 A1 | 11/2007 | Kawamoto et al. | |
| 2010/0178990 A1 | 7/2010 | Jansen | |
| 2015/0345575 A1 | 12/2015 | Antchak et al. | |

FOREIGN PATENT DOCUMENTS

WO 2007121582 A1 11/2007

OTHER PUBLICATIONS

European Patent Office, International Search Report and Written Opinion of the International Searching Authority, application No. PCT/US2018/048108, dated Dec. 19, 2018.

* cited by examiner

*Primary Examiner* — Mark A Manley
(74) *Attorney, Agent, or Firm* — Paul N. Dunlap, Esq.

(57) ABSTRACT

An isolating decoupler comprising a hub, a pulley journalled to the hub, a torsion spring having a first torsion spring end welded directly to the hub, a wrap spring having a first wrap spring end welded directly to a second torsion spring end, a wrap spring outer surface fictionally engaged with a pulley inner surface, and a wrap spring second end temporarily engagable with the torsion spring first end whereby the frictional engagement between the wrap spring outer surface and the pulley inner surface is progressively released as a torque load increases.

19 Claims, 8 Drawing Sheets

ISOLATING DECOUPLER

FIELD OF THE INVENTION

The invention relates to an isolating decoupler, and more particularly, to an isolating decoupler comprising a torsion spring directly connected to a hub by welding, and a wrap spring directly connected to the torsion spring by welding.

BACKGROUND OF THE INVENTION

This invention relates to alternator tuning devices, particularly to alternator isolating decouplers (AID) with torsion springs for isolation. The function and utility of alternator tuning devices is commonly known. Commercially available AID devices typically comprise an isolating spring, one way clutch, bearing(s), a pulley and certain other components which may include spring carrier(s). The need for each of these components typically requires the overall size diameter of the device to exceed what the industry desires. With ever smaller automotive engine sizes and ever increasing fuel efficiency requirements, there is a need for AID devices that have a reduced pulley diameter while meeting the required functionality. There is also a need for reduced complexity, simplified manufacture and commensurate reduction in overall cost.

Representative of the art is U.S. Pat. No. 8,888,619 which discloses a method for producing an over-running decoupler that is configured to transmit rotary power between a rotary member and a hub. The over-running decoupler includes a one-way clutch having a clutch spring, a carrier that is coupled to the clutch spring and at least one spring that resiliently couples the carrier to the hub. The method includes: establishing a desired fatigue life of the at least one spring; establishing a design deflection of the at least one spring during resonance, wherein deflection of the at least one spring at the design deflection during resonance does not reduce a fatigue life of the at least one spring below the desired fatigue life; and preventing resonance in the over-running decoupler by controlling a maximum deflection of the at least one spring such that the maximum deflection is less than or equal to the design deflection.

What is needed is an isolating decoupler comprising a torsion spring directly connected to a hub by welding, and a wrap spring directly connected to the torsion spring by welding. The present invention meets this need.

SUMMARY OF THE INVENTION

The primary aspect of the invention is an isolating decoupler comprising a torsion spring directly connected to a hub by welding, and a wrap spring directly connected to the torsion spring by welding.

Other aspects of the invention will be pointed out or made obvious by the following description of the invention and the accompanying drawings.

The invention comprises an isolating decoupler comprising a hub, a pulley journalled to the hub, a torsion spring having a first torsion spring end welded directly to the hub, a wrap spring having a first wrap spring end welded directly to a second torsion spring end, a wrap spring outer surface fictionally engaged with a pulley inner surface, and a wrap spring second end temporarily engagable with the torsion spring first end whereby the frictional engagement between the wrap spring outer surface and the pulley inner surface is progressively released as a torque load increases.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
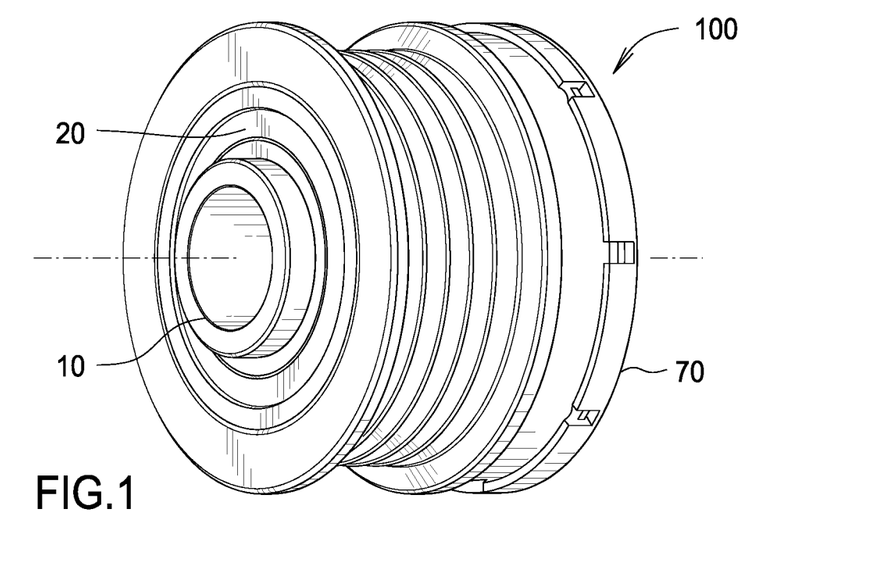
FIG. 1 is a perspective view of the inventive device.

FIG. 1 is a perspective view of the inventive device. The device comprises a hub 10, bearing 20, pulley and dust cover 70. Pulley 40 engages a multi-ribbed belt used in a belt drive system, for example, on a vehicle engine (not shown). In a driving direction the hub is coupled to the pulley. In an overrun condition the pulley is decoupled from the hub.

The inventive device comprises an all welded assembly between the hub and a torsion spring, and between the torsion spring and a one-way clutch wrap spring. This represents a significant improvement in simplicity and reduction in manufacturing costs over the prior art.

Figure 2:
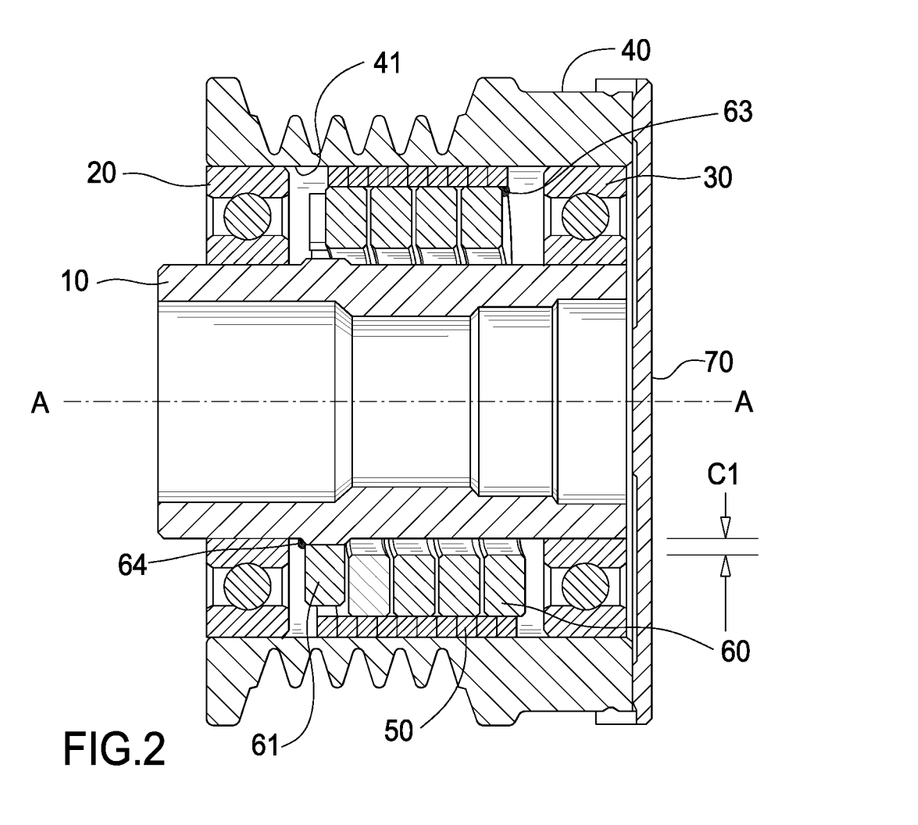
FIG. 2 is a cross section view of the inventive device.

FIG. 2 is a cross section view of the inventive device. Hub 10 engages a shaft such as an alternator shaft (not shown). Pulley 40 is journalled to hub 10 on bearing 20 and bearing 30. A torsion spring 60 is connected to a hub shoulder 11 and one-way clutch wrap spring 50. Wrap spring 50 frictionally engages an inner surface 41 of pulley 40. Torsion spring 60 is helically wound.

Wrap spring 50 is helically wound. Wrap spring 50 and torsion spring 60 are wound with the same handedness direction.

In operation, torque flow is from pulley 40 to wrap spring 50 to torsion spring 60 to hub 10. Pulley 40 has a multi-ribbed profile to engage a drive belt (not shown).

Shoulder 11 has a thickness that radially extends from the hub that provides for a clearance C1 between an inner radius of torsion spring 60 and hub surface 12 so that the torsion spring coils do not bind on the hub surface as a torque load increases. A torque load increase causes torsion spring 60 to radially contract. In this embodiment shoulder 11 is machined into hub 10 during manufacture. In an alternate embodiment, shoulder 11 may comprise a ring 11*a* that is press fit or welded to hub 10*a*, see FIG. 7.

Figure 3:
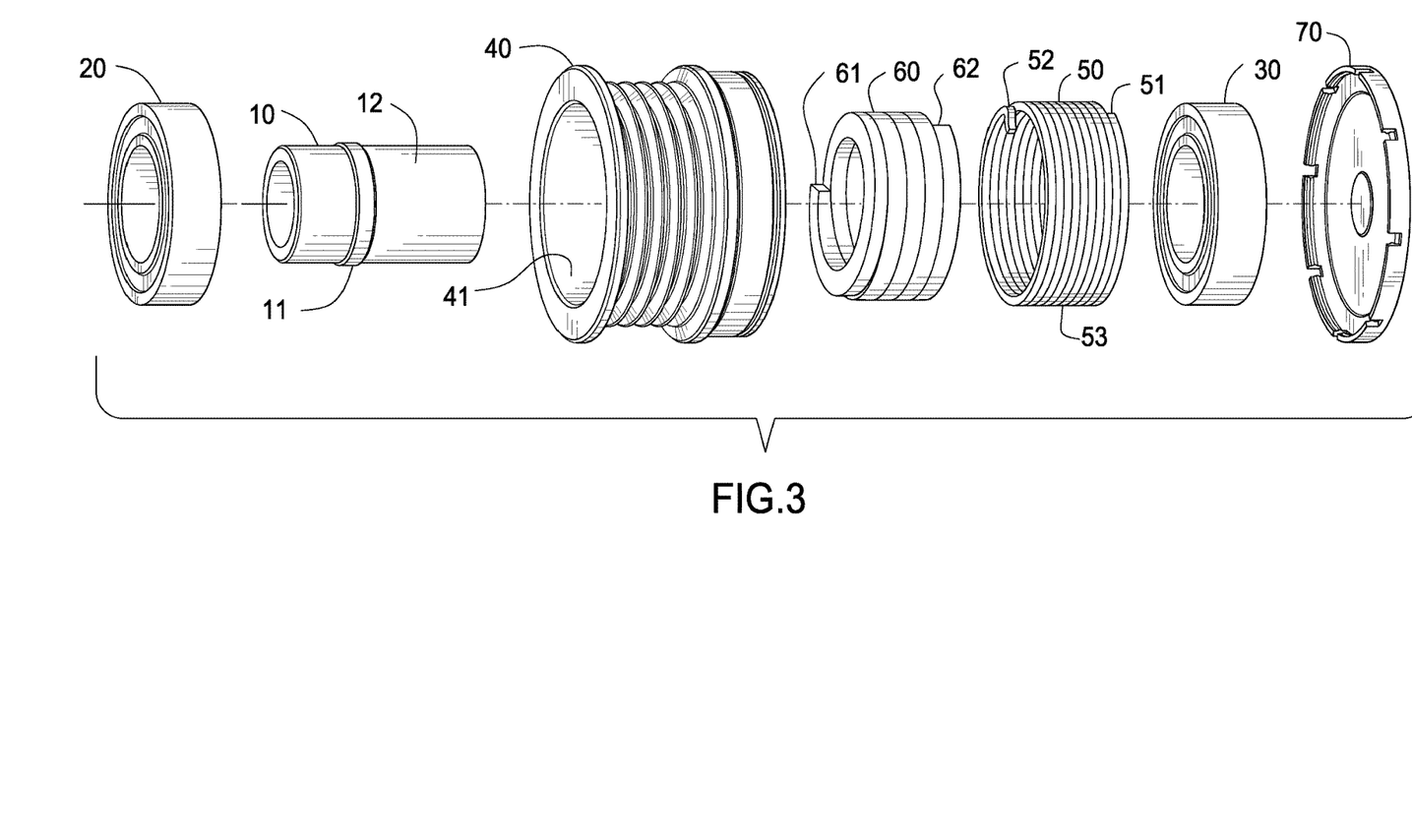
FIG. 3 is an exploded view of the inventive device.

FIG. 3 is an exploded view of the inventive device. Bearing 20 and bearing 30 comprise any suitable bearing know in the art, including for example, ball, roller, sleeve or bushing.

Spring 60 is disposed radially inward of wrap spring 50 to save space. Outer surface 53 of wrap spring 50 frictionally engages an inner surface 41 of pulley 40. The coils of wrap spring 50 progressively engage surface 41 as a torque load increases, that is, more spring coils come into engagement with surface 41 as the torque load increases.

Wrap spring 50 comprises a plurality of coils and an end 51 and end 52. End 52 comprises a tang to engage torsion spring 60. Torsion spring 60 comprises a plurality of coils and an end 61 and end 62. Wrap spring outer surface 53 comprises a coefficient of friction suitable to transmit torque from wrap spring 50 to pulley 40 without slip during an operating condition. Wrap spring 50 is installed in pulley 40 with a predetermined interference fit.

Dust cover 70 clips to one end of pulley 40 to prevent ingress of debris. Shoulder 11 projects in relief radially outward from hub surface 12. Shoulder 11 is machined into hub 10 during manufacture.

Spring 60 comprises a plurality of coils and is rectangular in cross section, which improves fit in the device. Wrap spring 50 is rectangular in cross section, which improves fit in the device between the wrap spring and the pulley.

By way of example but not limitation, spring 60 in FIG. 3 comprises about 4¾ coils. Wrap spring 50 comprises about nine coils.

Figure 4:
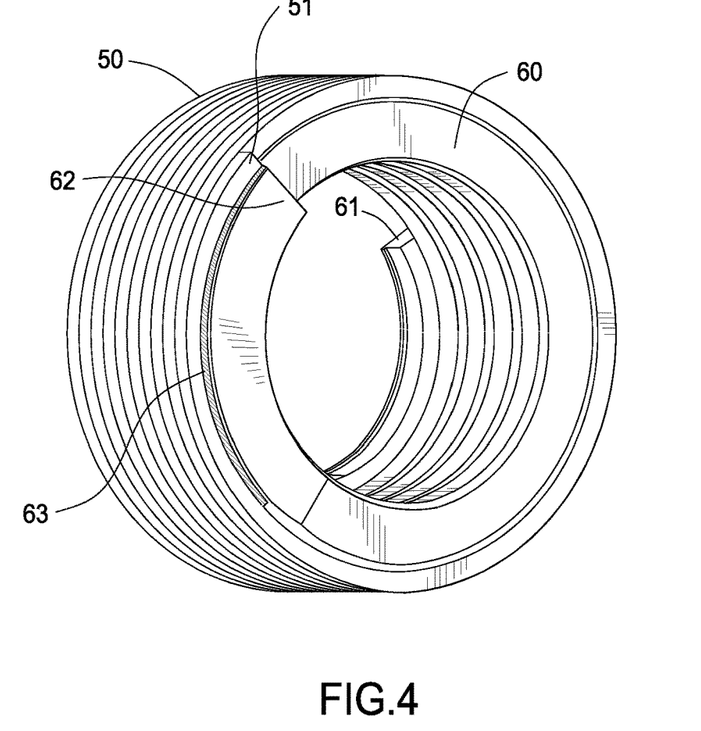
FIG. 4 is a perspective view of the spring and wrap spring.

FIG. 4 is a perspective view of the spring and wrap spring. Torsion spring 60 is concentrically disposed within the wrap spring and within an axial length of wrap spring along an axis A-A, which reduces envelope size of the device. Torsion spring 60 is radially inward of wrap spring 50. An inside diameter of wrap spring 50 is slightly greater than the outside diameter of spring 60 resulting in a clearance fit between them. A clearance fit prevents the wrap spring coils from binding on the torsion spring during operation. It also simplifies assembly of the device by obviating the need for press fit design and equipment.

End 51 is fixedly connected to end 62 of spring 60 by a weld bead 63. The weld bead may be by TIG weld, laser weld, braze or adhesive for example. Weld bead 63 extends through an angular range of less than one degrees (spot weld) to approximately 180 degrees. An example angle is approximately 90 degrees shown in FIG. 4. Given the simplified welded construction there is no need for a spring carrier in the inventive device.

Figure 5:
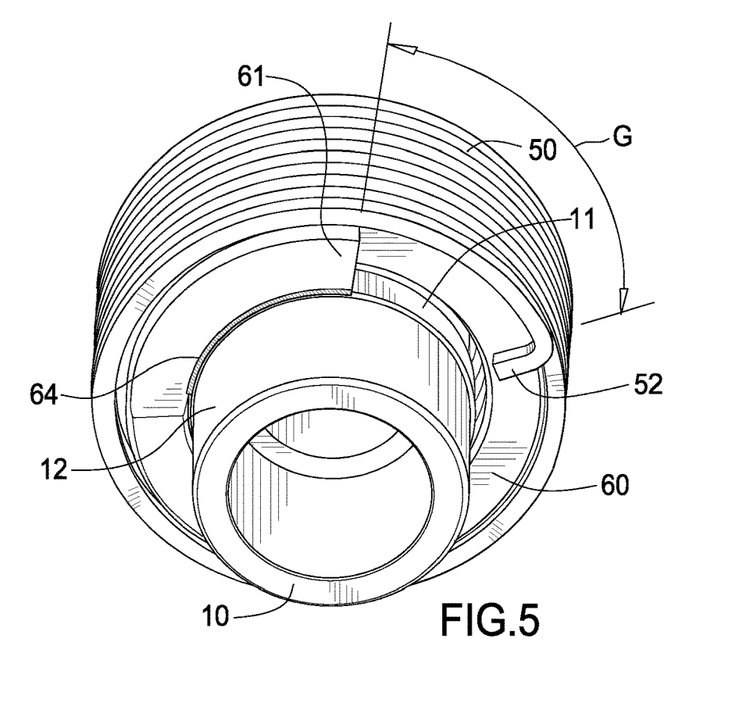
FIG. 5 is a perspective view of the spring and wrap spring.

FIG. 5 is a perspective view of the spring and wrap spring. End 61 is fixedly connected to shoulder 11 by a weld bead 64. The weld bead may be by TIG weld, laser weld, braze or adhesive for example. Weld bead 64 extends through an angular range of approximately 5 degrees to 180 degrees. An example angle is approximately 90 degrees shown in FIG. 5. End 52 projects radially inward to engage end 61 according to a torque load condition. In typical operation under normal torque loads there is a gap G such that end 61 of spring 60 does not contact end 52 of wrap spring 50.

Torque is transmitted from pulley 40 to warp spring 50 to torsion spring 60 to weld 64 to hub 10. Wrap spring 50 frictionally engages surface 41 as it is loaded in the unwinding direction. Loading in the unwinding direction causes wrap spring 50 to unwind and therefore radially expand. The radial expansion presses wrap spring into a frictional lock with surface 41.

In the case of a torque reversal hub 10 overruns wrap spring 50 in the winding direction, which disengages wrap spring surface 53 from surface 41.

Figure 6:
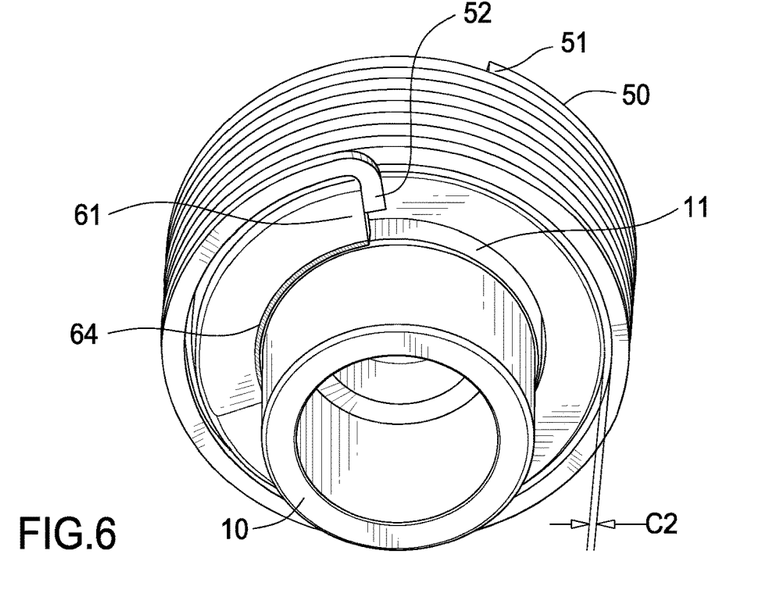
FIG. 6 is a perspective view of the spring and wrap spring.

FIG. 6 is a perspective view of the spring and wrap spring. As torque load increases to an upper predetermined limit the relative position of end 61 advances with respect to end 52 as spring 60 winds up. Spring 60 loads in the winding direction. As torque load further increases gap G closes and end 61 contacts end 52. As end 61 progressively presses upon end 52 wrap spring 50 is urged to "wind up" wrap spring 50 in the winding direction and thereby radially contract which causes outer surface 53 of wrap spring 50 to progressively disengage from the inner surface 41 of pulley 40, thereby incrementally releasing an excessive torque load by allowing slip between spring 50 and pulley 40. In this manner wrap spring 50 is unloaded as end 52 is pressed further in the winding direction. This torque limiting feature protects the device during an over-torque event.

The torque limiting feature is facilitated by a clearance C2 between the wrap spring and torsion spring. Clearance C2 prevents binding between the coils of wrap spring 50 and torsion spring 60 which allows wrap spring 50 to radially contract as it "winds up" under a torque load thereby incrementally releasing an engagement with the pulley surface 41.

Figure 7:
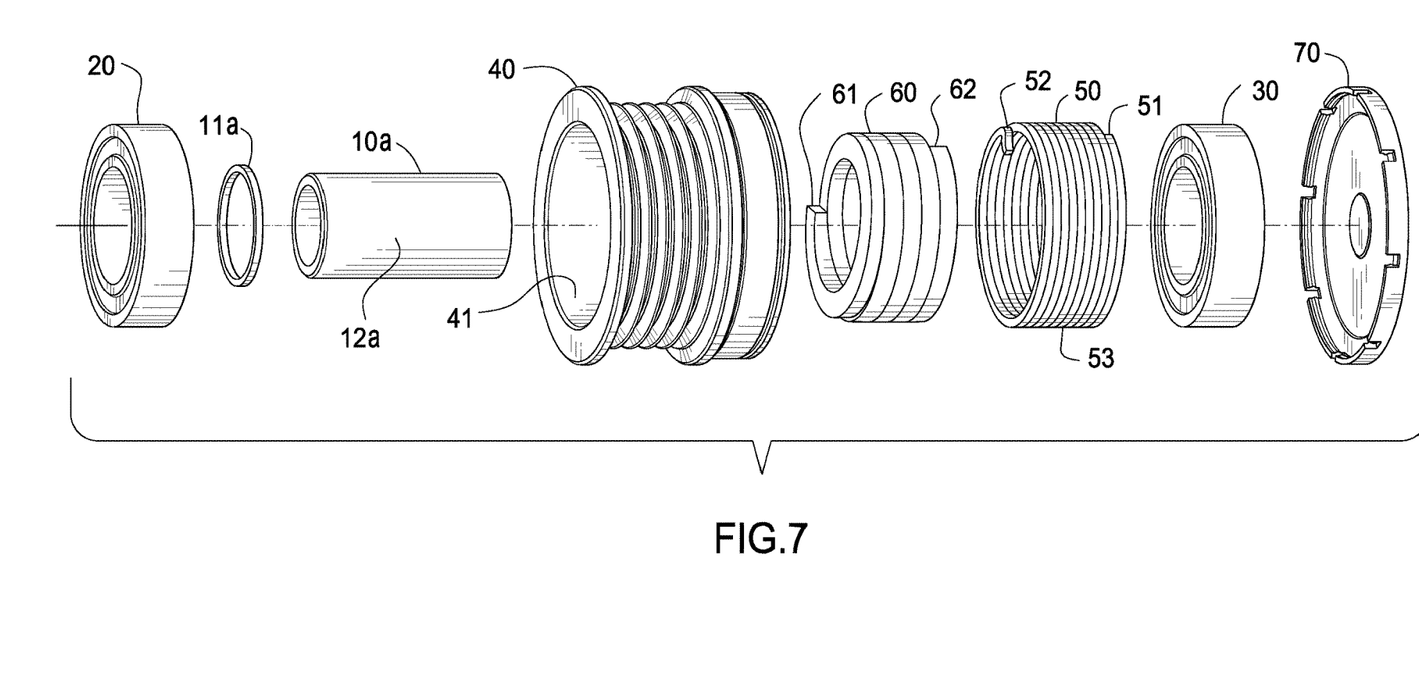
FIG. 7 is an exploded view of an alternate embodiment.

FIG. 7 is an exploded view of an alternate embodiment. Shoulder 11a comprises a ring that is press fit or welded to hub 10a. End 61 is fixedly connected to shoulder 11a by a weld bead 64 as shown in FIG. 6. The weld bead may be by TIG weld, laser weld, braze or adhesive for example. In this embodiment surface 12a of hub 12 is cylindrical. This embodiment allows variability in the axial position of the torsion spring attachment on the shoulder which in turn provides manufacturing flexibility for device operating characteristics governed in part by the axial length of the torsion spring.

In yet another alternate embodiment shoulder 11a is omitted. End 61 is fixedly connected directly to surface 12a of hub 10a by a weld bead 64 as described in FIG. 6.

Figure 8:
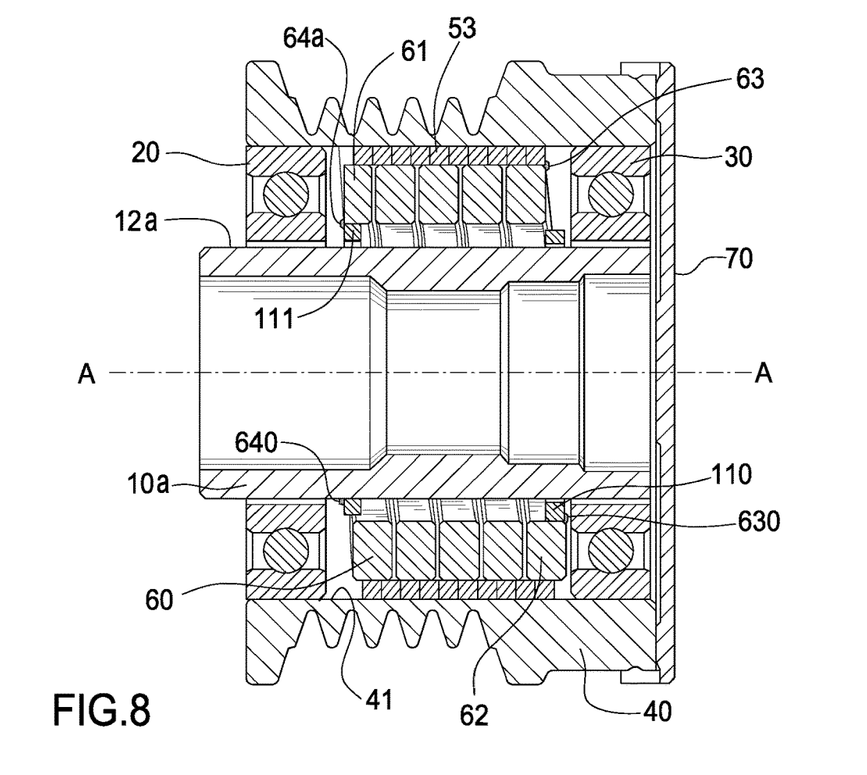
FIG. 8 is a cross section view of an alternate embodiment.

FIG. 8 is a cross section view of an alternate embodiment. In this embodiment shoulder 11 is omitted. Ring 110 and ring 111 support end 62 and end 61 of torsion spring 60 respectively. Ring 110 and ring 111 displace torsion spring 60 from hub 10 in order to create clearance C1, see FIG. 2.

Figure 9:
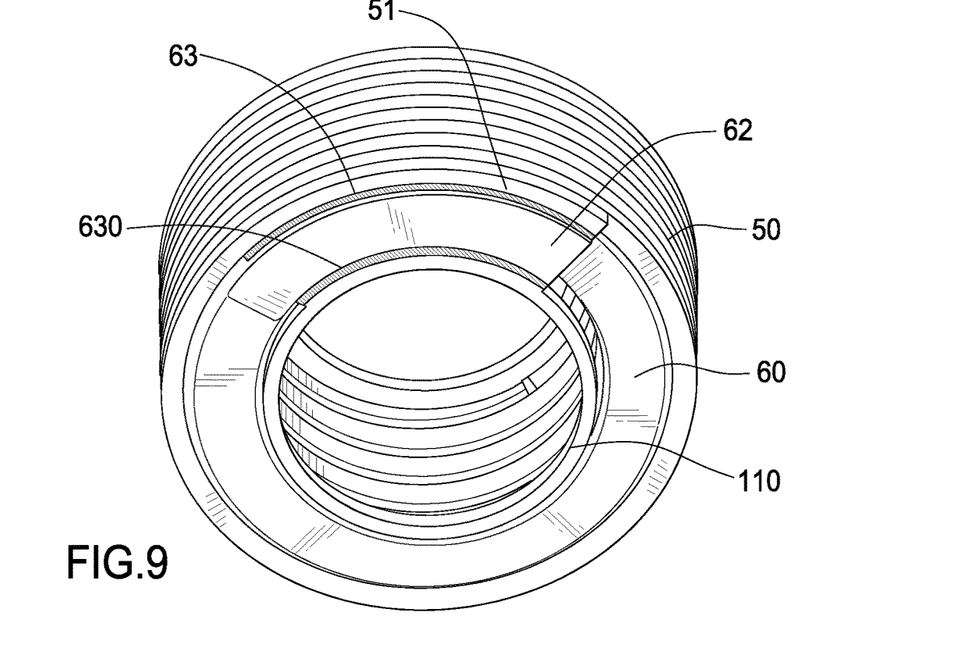
FIG. 9 is a perspective view of an alternate embodiment in FIG. 8.

FIG. 9 is a perspective view of an alternate embodiment in FIG. 8. Ring 110 comprises a landing portion 110a to which end 62 is welded by weld bead 630. Landing portion 110a comprises a thickness C1, see FIG. 2. End 51 of wrap spring 50 is welded to end 62 by weld bead 63 as described herein, see FIG. 4. Ring 110 is not welded to hub 10, instead, ring 110 has a clearance fit with surface 12 to allow ease of relative movement between ring 110 and hub 10. Welding techniques for this embodiment are as described in this specification for the other embodiments.

Figure 10:
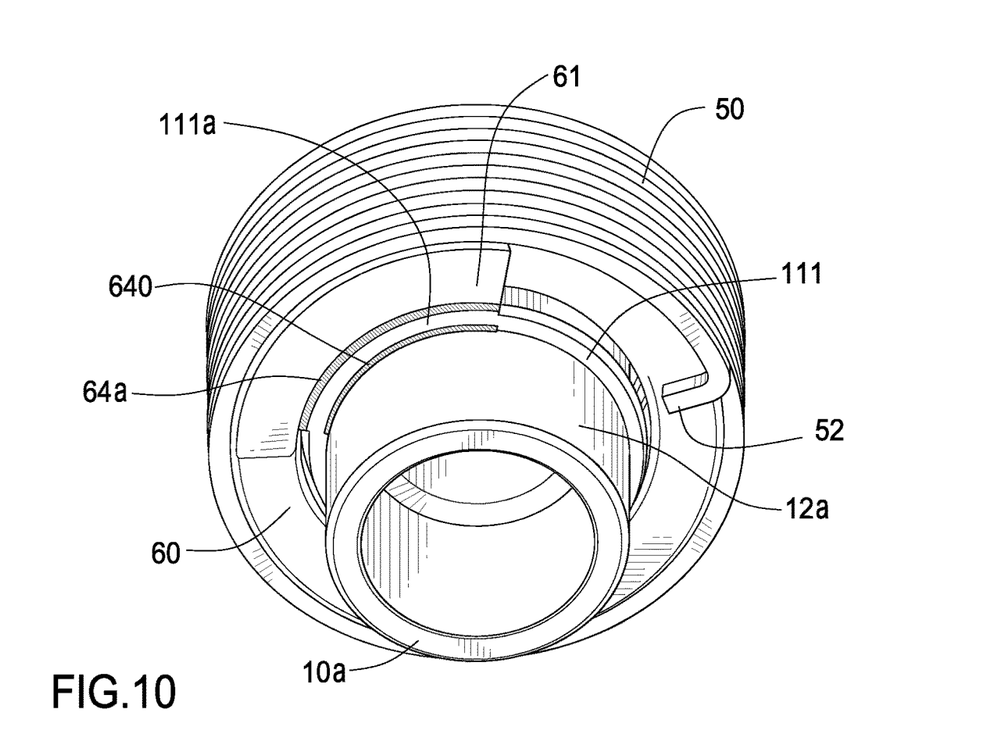
FIG. 10 is a perspective view of an alternate embodiment in FIG. 8.

FIG. 10 is a perspective view of an alternate embodiment in FIG. 8. Ring 111 comprises a landing portion 111a to which end 61 is welded by weld bead 64a. Landing portion 111a comprises a thickness C1. Landing portion 111a is welded to hub 10 by weld bead 640. Welds for this embodiment are as described elsewhere in this specification.

In the instant device use of welded construction provides means to adjust the spring characteristics, namely torque and deflection, and thereby the operating characteristics of the device, all during manufacture. Namely, the length of weld bead 64 determines the length of the active coils for torsion spring 60. The portion of torsion spring 60 that is welded to the hub does not contribute to the spring characteristic of spring 60. For a given overall original length of an uninstalled torsion spring 60, for example, 4¾ coils, use of a weld bead having a length of 90 degrees (¼ coil) results in 4¾-¼ or about 4½ active coils for the installed torsion spring. Therefore, the number of active coils is selected by varying the length of the weld bead. Hence, during manufacture the characteristics of a given spring can be fine-tuned by varying the length of the weld bead to control the total number or length of the active coils. Further, selective adjustment of spring characteristic is accomplished in real time during manufacture given a measured torsion spring characteristic compared to a final installed characteristic by adjustment of the weld bead length.

Figure 11:
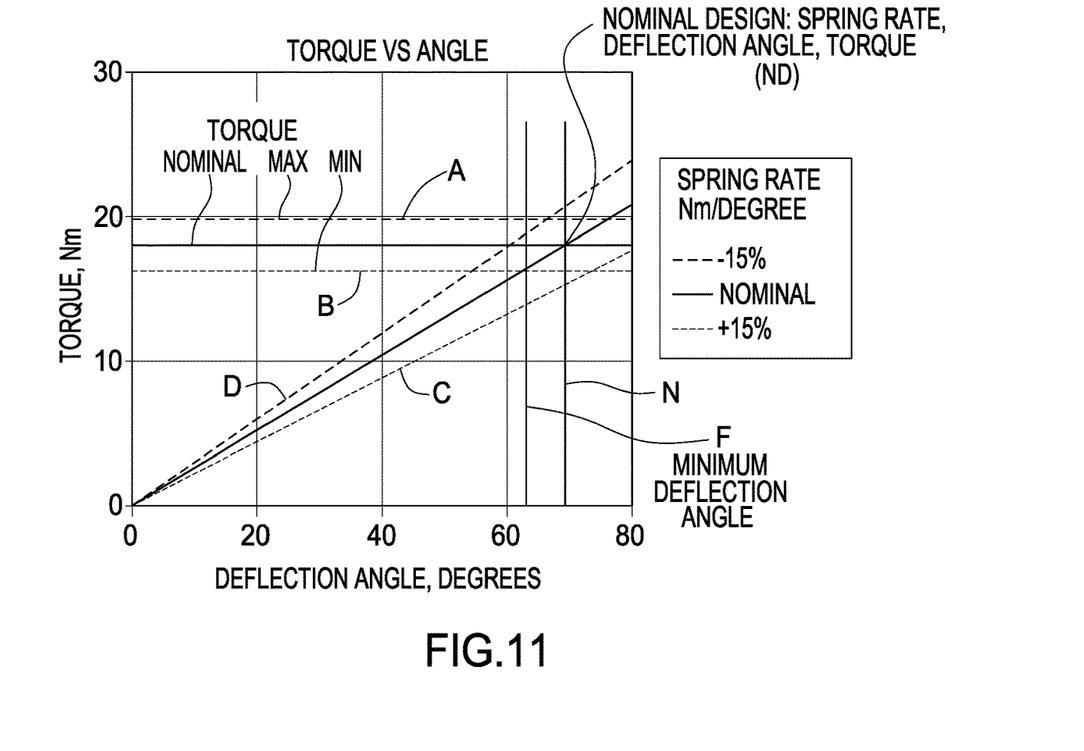
FIG. 11 is a graph showing torque versus deflection angle.

FIG. 11 is a graph showing torque versus deflection angle. The device is characterized by the torsion spring rate and torsion spring deflection angle. The torsion spring rate usually has a tolerance in the range of +/−15%. In FIG. 11 an exemplary nominal spring rate is ~0.26 Nm/degree. A minimum spring rate is ~0.22 Mn/degree and a maximum spring rate is ~0.3 Nm/degree. A nominal deflection angle is ~69.23 degrees. Torque at this deflection angle is ~18 Nm (0.26 Nm/degree×69 degrees). The minimum deflection angle is usually 10% smaller of 62.3 degrees. The numbers are by way of example only and are not intended to limit the scope of the invention.

The area of FIG. 11 contained within the boundary of lines A, B, C, D represents the range of characteristics of the device that are acceptable for proper system performance. The nominal design point (ND) indicates a set of target design values for torsion spring rate, deflection angle and torque for a given device and system. The variation of torque, deflection angle and spring rate can be very broad within these limits for a given set of torsion springs. The inventive device provides means to control the variability of these factors. The ND in FIG. 11 is an example and can vary depending on the system requirements.

Figure 12:
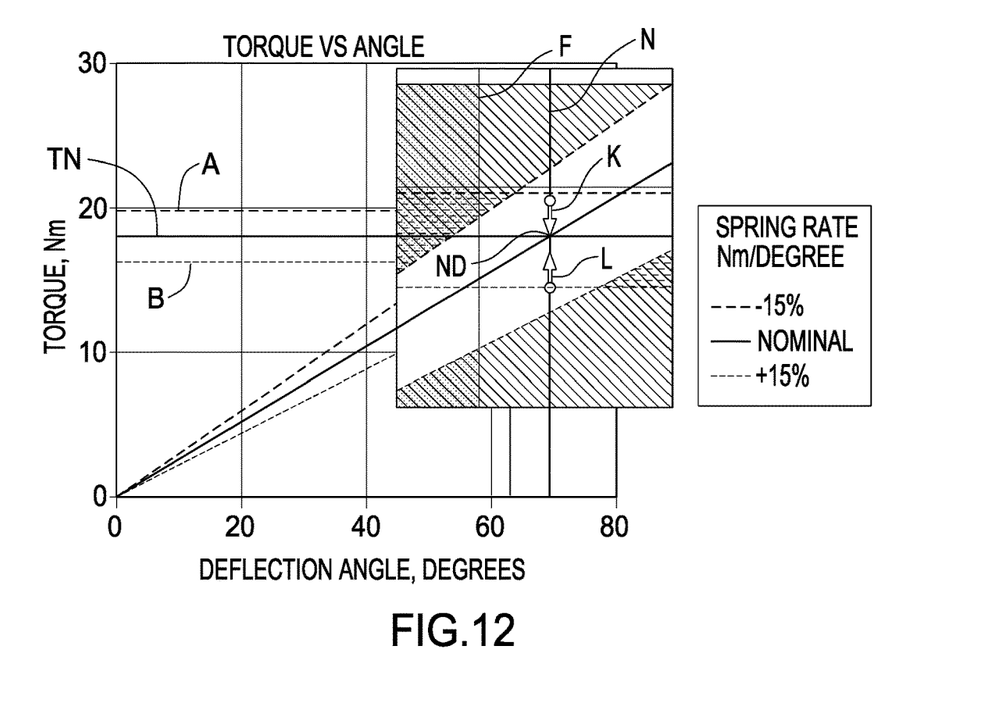
FIG. 12 is a graph showing torque versus deflection angle.

In the inventive device spring deflection can be limited to a predetermined angle. FIG. 12 is a graph showing torque versus deflection angle. In FIG. 12 acceptable torsion springs 60 will have the same deflection (F) but may have different torques and spring rates for that given deflection, for example, the area between lines A and B. During welding, the spring rate can be adjusted by selecting the location and length of welds to change the number of active coils of spring 60. Changing the spring rate in this manner can be used to adjust the torque of the decoupler to a nominal value which produces the desired deflection angle, see line TN and two arrows K, L directed to line TN.

Figure 13:
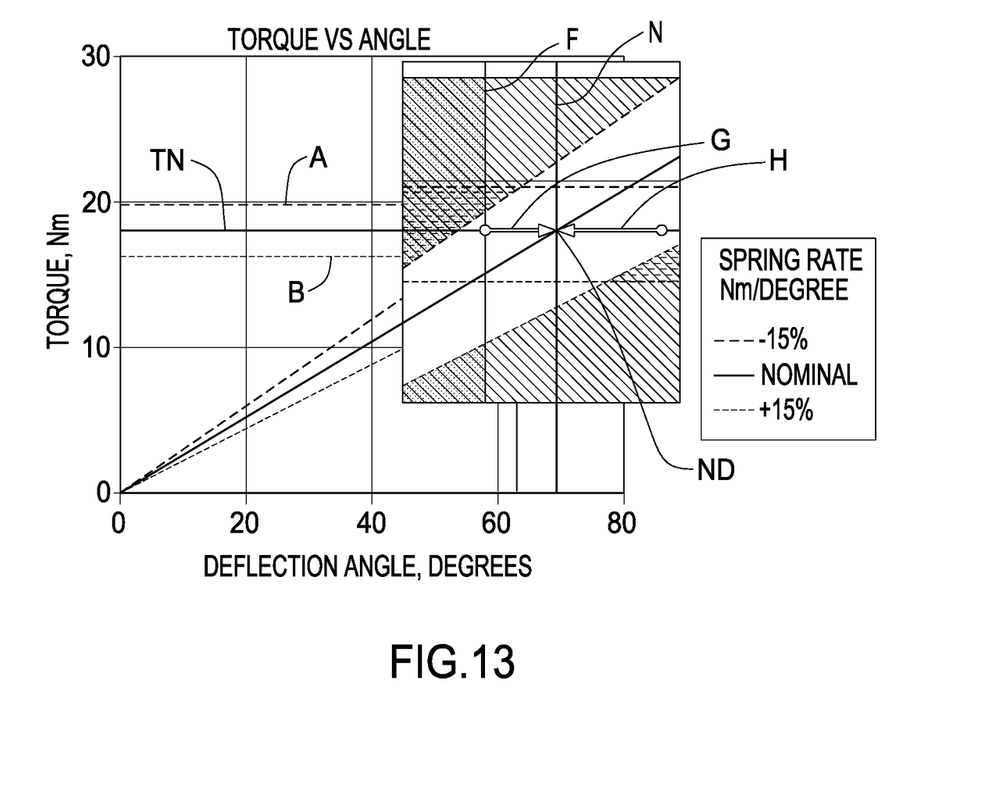
FIG. 13 is a graph showing torque versus deflection angle.

The device can also be programmed to give desired torque values by changing a selected deflection angle. FIG. 13 is a graph of torque versus deflection angle. In FIG. 13 acceptable springs 60 will have the same torque TN but different deflection angle values, see lines F and N. During welding the deflection angle can be adjusted by selecting the location and length of welds to change the number of active coils of spring 60 and thereby adjust the deflection angle to a nominal value which produces a desired torque, see two arrows G, H directed to line TN.

An isolating decoupler comprising a hub, a pulley journalled to the hub, a torsion spring having a first torsion spring end welded directly to the hub, a wrap spring having a first wrap spring end welded directly to a second torsion spring end, a wrap spring outer surface fictionally engaged with a pulley inner surface, and a wrap spring second end temporarily engagable with the torsion spring first end whereby the frictional engagement between the wrap spring outer surface and the pulley inner surface is progressively released as a torque load increases.

An isolating decoupler comprising a hub, a pulley journalled to the hub, a torsion spring directly connected to the hub by a weld, a wrap spring directly connected to the torsion spring by a weld, and the wrap spring fictionally engaged with a pulley surface to transmit a torque load.

A method of manufacturing an isolating decoupler comprising journaling a pulley to a hub, welding a torsion spring first end directly to the hub with a weld bead, selectively adjusting the weld bead length to achieve a desired torsion spring final characteristic, welding a wrap spring end directly to a torsion spring second end, and engaging the wrap spring fictionally with a pulley surface.

Although forms of the invention have been described herein, it will be obvious to those skilled in the art that variations may be made in the construction and relation of parts without departing from the spirit and scope of the invention described herein.

We claim:

1. An isolating decoupler comprising:
a hub;
a pulley journalled to the hub;
a torsion spring directly connected to the hub by a laser weld;
a wrap spring directly connected to the torsion spring by a weld; and
the wrap spring frictionally engaged with a pulley surface.

2. The isolating decoupler as in claim 1, wherein the torsion spring is concentrically disposed within an axial length of the wrap spring.

3. The isolating decoupler as in claim 1, wherein the torsion spring is welded to a hub shoulder.

4. The isolating decoupler as in claim 1, wherein the torsion spring is loaded in a winding direction.

5. The isolating decoupler as in claim 1, wherein the wrap spring is disengaged from the pulley surface by a torque load in a winding direction.

6. The isolating decoupler as in claim 1, wherein the wrap spring is engaged with the pulley surface by a torque load in a wrap spring unwinding direction.

7. The isolating decoupler as in claim 1, wherein the weld of the wrap spring is a laser weld.

8. The isolating decoupler as in claim 1 further comprising:
a wrap spring end releasably engagable with the torsion spring whereby upon a progressing engagement with the torsion spring the frictional engagement between the wrap spring and the pulley surface is incrementally released as a torque load increases.

9. An isolating decoupler comprising:
a hub;
a pulley journalled to the hub;
a torsion spring having a first end directly connected to the hub by a laser weld;
a wrap spring directly connected to a torsion spring second end by a laser weld;
the wrap spring radially expandable to frictionally engage a pulley surface to transmit a torque load; and
a wrap spring end releasably engagable with the torsion spring whereby upon engagement with the torsion spring the frictional engagement between the wrap spring and the pulley surface is progressively released as a torque load increases.

10. The isolating decoupler as in claim 9, wherein the progressive frictional engagement release is caused by radial contraction of the wrap spring.

11. The isolating decoupler as in claim 9 wherein the torsion spring first end is laser welded to a hub shoulder, the hub shoulder radially extending from a hub surface.

12. The isolating decoupler as in claim 9, wherein the torsion spring radially contracts under load.

13. The isolating decoupler as in claim 9, wherein the torsion spring is concentrically disposed within the wrap spring and within an axial length of the wrap spring.

14. The isolating decoupler as in claim 11, wherein the hub shoulder comprises a ring.

15. The isolating decoupler as in claim 14 further comprising a second ring welded to the torsion spring second end, the second ring having a clearance fit on the hub.

16. A method of manufacturing an isolating decoupler comprising:
- journaling a pulley to a hub;
- welding a torsion spring first end directly to the hub with a weld bead;
- selectively adjusting the weld bead length to achieve a desired torsion spring characteristic;
- welding a wrap spring end directly to a torsion spring second end; and
- engaging the wrap spring frictionally with a pulley surface.

17. The method as in claim 16 comprising controlling a number of active torsion spring coils by selectively adjusting the weld bead length.

18. The method as in claim 16, wherein the torsion spring characteristic is a spring rate.

19. The method as in claim 16, wherein the torsion spring characteristic is a deflection angle.

* * * * *